Patented Nov. 11, 1924.

1,514,657

UNITED STATES PATENT OFFICE.

ALFRED H. COWLES, OF SEWAREN, NEW JERSEY, ASSIGNOR TO THE ELECTRIC SMELTING & ALUMINUM COMPANY, OF SEWAREN, NEW JERSEY.

PROCESS OF PRODUCING ALUMINA, ALKALI, AND DICALCIUM SILICATE.

No Drawing. Original application filed November 20, 1915, Serial No. 62,486. Divided and this application filed May 17, 1920. Serial No. 382,066.

*To all whom it may concern:*

Be it known that I, ALFRED H. COWLES, a citizen of the United States, and a resident of Sewaren, in the county of Middlesex and State of New Jersey, have invented a certain new and Useful Process of Producing Alumina, Alkali, and Dicalcium Silicate, of which the following is a specification.

The object of the invention is to furnish a process for obtaining from silicious aluminous materials or mixtures the constitutents that form alkali metal aluminate from which alumina, and caustic alkali or alkali metal carbonates may be separated. At the same time there is secured a residue, or insoluble product, that can be employed in the manufacture of sand-lime bricks, in lieu of lime, and some silica, or in the manufacture of cement, by the addition of one molecule of lime to the calcium oxide therein.

This case is a division of my application Serial Number 62,486, filed November 20th, 1915.

The substances to be treated can be any mixture, natural or artificial, which when charged in a furnace shall give a sintered or fused product containing, as closely as can be attained, such proportions of oxides as shall be equivalent to the molecular weight of two molecules of an alkali earth oxide (preferably lime CaO) to one molecule of silica ($SiO_2$), and less than one and seventy-six hundredths molecules of an alkali metal oxide ($Na_2O$ or $K_2O$) to one molecule of alumina ($Al_2O_3$). The presence of iron oxide, titanic oxide and some others, does not interfere with the process; they may, or may not be present, since they are practically insoluble under conditions of leaching to be hereafter described. If alkaline earth oxides are present as constituents or impurities in the above minerals or mixtures, they can be allowed for in forming the mixtures.

In making my invention I have availed myself of the known fact that if two molecules of soda ($Na_2O$) and two molecules of lime (CaO) are combined with one molecule each of the acid compounds alumina and silica or very nearly in that ratio, there is formed by sintering or fusing a product from which nearly all of the dialkali, for for example, di-sodium aluminate ($Na_2O$) ($Al_2O_3$) can be leached away from the ortho-silicate of calcium ($SiO_2 2CaO$) or dicalcium silicate. (See U. S. Patent No. 708,561, of Sept. 9th, 1902 to Kayser. And I have discovered that in the sintered or melted mixture I can successfully leach away alkali metal aluminate when the molecular weight ratio of alkali metal oxide, $Na_2O$ or $K_2O$ to alumina ($Al_2O_3$) molecules is considerably lower than one and seventy-six hundredths molecules of alkali metal oxide to one molecule of alumina, leaving the dicalcium silicate, or ortho silicate of calcium ($SiO_2 2CaO$) as the residue containing small amounts of alumina and alkali metal oxide and insoluble impurities such as iron oxide, etc. The liquor that I thus secure is a solution of alkali metal aluminate much more suited for the manufacture of pure alumina and pure alkali than that obtained by the employment of one and seventy-six hundredths molecules of alkali to one of alumina. In order to accomplish this result, it is desirable that the sinted product which is secured, should immediately be leached and not given time to absorb carbonic acid and water from the atmosphere. With this precaution taken, a ratio of sodium metal oxide for example, and alumina in the sintered mixture containing as low as 1.1 molecules of sodium metal oxide ($Na_2O$) to one molecule of alumina has been leached by me and very satisfactory results secured, though the leaching is somewhat more rapid, if the alkali metal oxide be slightly increased (but it should not be increased to approximate one and seventy-six hundredths molecules of alkali metal oxide to one molecule of $Al_2O_3$ in the solution). The solution of low ratio then becomes one of superior value for use in separating the alumina from the alkali, following the lines of the well-known Bayer process. See U. S. Patents 382,505 of May 8, 1888, and 515,896 of March 6, 1894. This process, as is well known, produces alumina of the highest purity and in a form to be readily washed and left free from caustic soda, or carbonate of soda, the presence of which impurities greatly decreases the value of the alumina produced for the manufacture of the metal aluminum. Herein lies the great and important use for alumina.

In operating the Bayer process, the larger the percentage of alkali metal in the alkali metal aluminate solution, the slower the process, and the less the proportion of alumina that separates from the solution during standing, or during agitation of the solution. Therefore the alkali metal aluminate solution should be as low in alkali metal content as is consistent with the previous leaching process involved in securing it. Two molecules of alkali metal oxide to one molecule of $Al_2O_3$ is too high. The $Al_2O_3$ that will voluntarily precipitate becomes only one-half as much as when one molecule of $Na_2O$ or alkali metal oxide to one of $Al_2O_3$ is present under like conditions of temperature and density of solution. The liquor left after precipitation of alumina by the Bayer process contains from 5 to 7 molecular weights of $Na_2O$ to one molecular weight of $Al_2O_3$. The less the quantity of this liquor, the less reagent is required to remove the $Al_2O_3$ and produce a pure caustic solution. If the liquor is of twice the quantity, as when two molecules of sodium metal oxide to one of alumina are used, then twice the $Al_2O_3$ remains with the liquor, and twice the reagent is required for precipitation, and the quantity of the material thus precipitated and which must be retreated leads to prohibitive costs and additional losses. Herein lies the importance of employing in the mixture that I charge to a furnace a smaller ratio of alkali metal oxide to alumina than that mentioned in the above referred to patent to Kayser and in my published papers of 1912 before the Eighth International Congress of Applied Chemistry, volume 25, page 119, and before a joint meeting of the American Electrochemical Society, etc., printed in the Journal of Industrial and Engineering Chemistry, volume 5, No. 4, April 1913.

Having thus described my discovery and set forth the advantages gained thereby over what is well known in the chemistry of the art, I will now describe how the invention and its discovered application may be employed.

I take an alkali silico aluminate such as leucite, orthoclase or zeolite, or mixed materials containing an oxide of an alkali metal and $Al_2O_3$ and $SiO_2$ and determine their exact chemical composition. They may be made artificially from salt, clay and steam by methods described in patents already issued to me (Nos. 1,040,893 and 1,040,894, dated October 8, 1912; 1,123,693, dated January 5, 1915) and to Kayser and Cowles (No. 1,041,599, dated October 15, 1912), or they may be secured as minerals, or their equivalents may be secured by mixtures of minerals that occur largely in nature, with alkali metal carbonates. It is desirable to select such minerals as will enable one to secure an alkali-silico aluminate that contains as low an amount of silica as is practically securable, for, when the mixture is made for treatment, there must be proportioned to each molecule of silica in the mixture two molecular weights of calcium oxide, or its equivalent calcium carbonate, etc. The lower the silica contents, the less the calcium oxide needed, and the less bulky is the final product to be leached.

An artificial sodic-silico-aluminate of the composition $(Na_2O)_{1.4} 2SiO_2 . Al_2O_3$ made by me on a large scale, and containing but two molecules of silica, works well. To this mixture 4 molecular equivalents of lime, or calcium carbonate must be added in preparing the mixture for sintering.

The mineral "leucite," quite common in nature has, when pure, the formula $K_2O\text{-}Al_2O_3 4SiO_2$. This mineral should be ground with eight molecular equivalents by weight of lime (CaO) to each four molecular equivalents by weight of silica in its composition. To prepare this mixture for sintering, it is desirable to add substantially less than seventy-six hundredths and more than one tenth of an alkali metal carbonate molecule, or its equivalent, when excellent results will be attained.

In case a mixture of clay and calcium carbonate, sodium carbonate and silica is used, the carbonic acid is driven off from the calcium carbonate and the alkali metal carbonate, and the mixture should be so formed that the sintered product contains, as nearly as possible, two molecules of calcium oxide to one molecule of silica, in their molecular weight proportioned, while the alkali metal oxide should be preferably sufficiently above the ratio of one molecular weight of alkali oxide to one of alumina that the sintered product, even without boiling and at ordinary temperature will freely leach, and that such leaching shall not be interfered with by the absorption of carbonic acid gas from the atmosphere. This ratio should not extend up to one and seventy-six hundredths molecules of the alkali metal oxide to one of alumina for reasons given above. A ratio of 1.5 of alkali oxide to one of alumina in the product formed gives good results.

Just in proportion as we increase the ratio, the difficulties of recovering the pure alumina from the sodic aluminate solution greatly increase and render the process one that departs from practical utility, in the manufacture of alumina, in coordination with the Bayer process.

Some of the alkali zeolites are preferable in forming the mixture, to the alkali feldspars, such as orthoclase and albite, since they can be found containing much less silica in their composition than the feldspars. I have found, however, that the process works very satisfactorily upon orthoclase feldspar, the composition of which, when pure, is $K_2OAl_2O_36SiO_2$. To such a feldspar, again, there should be added two molecular weights of calcium oxide, or calcium carbonate to each molecular weight of silica in its composition, and it is preferable to add a fraction substantially less than seventy-six hundredths of a molecule of an alkali hydroxide or carbonate.

If free silica is present in any of these minerals mentioned, sufficient calcium carbonate or lime should be added in excess to allow for such free silica and to combine one molecular weight of it with two molecular weights of calcium oxide.

Having once determined the exact composition of the above minerals, mixtures of them may be employed, since one can always add sufficient calcium oxide, calcium carbonate, or other alkali earth oxide or calcium salts to give in the product two molecular weights of calcium oxide to one molecular weight of silica. It is preferable that there should also be added to the mixture sufficient alkali metal oxide, either as carbonate or caustic, to elevate the ratio of 1 alkali metal oxide to 1 alumina ($Al_2O_3$) sufficiently to facilitate leaching and prevent loss of alumina during leaching of the sintered mixture on account of loss of alkali in furnacing, or by the action of carbonic acid of the air and water, either preparatory to or during the leaching, converting alkali metal oxide or calcium oxide into their respective carbonates. The absorption of the carbonic acid goes on very fast, and to the extent that it is absorbed, it lessens the amount of mono-alkali-aluminate that passes into the leach water, especially so when there is no excess of alkali over and above the ratio of 1 alkali molecule to 1 alumina molecule. In no case is it necessary to go above one and seventy-six hundredths molecules of alkali metal oxide to 1 molecule of alumina. If alkaline earth oxides be present in the mineral or minerals to which lime or its equivalent is added, allowance must be made therefor, and less lime added in order to secure the ratio of two calcium oxide to one silica in the product. Other alkaline earth oxides or carbonates, either in the lime or in the alkali-silico aluminate material, should be treated as though they were calcium compounds in forming the calculation for the mixture. An excess of lime in the mixture results during leaching in the formation of insoluble calcium aluminate, thus interfering with high recovery. On the other hand too much silica in the mixture results in leaving in the residue insoluble hydrated aluminum alkali metal silicate, which interferes with the extraction of alumina in leaching. In all cases the mixture should be ground fine enough so that, according to the length of time it is submitted to heat to secure sintering or fusion, it will give a uniformly converted product. Some moisture added to this finely ground mixture is advantageous, especially if the operation is carried on in a rotary furnace, and when there is an alkali carbonate in the mixture, it especially tends to nodulize the mixed material in the furnace and the lighter dusts are therefore, not blown away. Should it be found in practice that there is more dust of certain materials blown out of the furnace than of others, compensation for this should be made in forming the mixture. The temperature of sintering varies somewhat with the nature of the alkali metal oxide present in the mixture, ranging, when sodium oxide is a compound of the mixture around 1300° C. But with potassium or lithium oxide, the temperature will vary slightly from this, these oxides giving more easily fusible products. At this temperature a friable, porous, non-vitreous sinter is obtained in excellent condition for leaching. The temperature may be raised and the mass fused, and still the product can be very efficiently leached. The charge does not tend to adhere to the lining of a rotary kiln in practice, and works at a lower temperature about 150° C., than in the practice of making hydraulic cement. The raw product from the rotary furnace can be used to spread on the land as a fertilizer.

My process can be used where in the resultant product there is but one molecule of the alkali metallic oxide to one molecule of ortho-silicate of calcium, or di-calcium silicate, which is insoluble and from which the mono sodium aluminate may be leached. When, however, this mixture is used the recovery of alumina, due to loss of alkali metal in furnacing and to the absorption of carbonic acid during the leaching process, is lessened, as there is not quite enough alkali metal to combine with all the alumina, and were less than one molecule of alkali metal oxide to one molecule of alumina employed in the mixture, the efficiency of the process increasingly diminishes.

In the Bayer patent of 1894, the ratio of $Al_2O_3$ to $Na_2O$ is set forth as 1 $Al_2O_3$ to 1.75 or 1.85 $Na_2O$. This would imply for my process, in the sintered product ready for leaching the same ratio of alumina to sodium metal oxide. But, I have found that such is not necessary, and especially so, if in the leaching a lye is employed consisting of a pure caustic alkali, or an alkali containing 5 or more molecules of sodium metal oxide or potassium metal oxide to one molecule of alumina. In this case the ratio of $Na_2O$ in the sintered product to alumina can fall below the ratio of one and one. Concerning statements herein relating to adding the carbonate of an alkali to the charge fed to the rotary furnace, it is to be noted that a pure alkali, such as caustic soda, or caustic potash may be used, or even an alkali containing a little alumina, if the whole mix be properly proportioned as to the ratio of two molecules of lime to one molecule of silica. Pure lime works best, and is the cheapest and hence is preferred. It may contain magnesia but when the magnesium carbonate or magnesium oxide is too high, I find that it does not work so well. Hence, of all the alkali earth oxides that are stated to be equivalent to lime, I prefer lime and only such other alkaline earths as work satisfactorily and which do not form, under leaching, an alkali earth aluminate, but do form a di-alkali earth silicate, or ortho-silicate of an alkaline earth. It is when these insoluble di-alkaline earth silicates are formed that the process works at maximum efficiency.

If as a source of calcium oxide in the mixture, I employ calcium chloride and use a lower heat at first passing sufficient steam over the mixture to convert the calcium chloride into calcium oxide, and then elevate the temperature to effect complete sintering, I find, there is a tendency for the alkali chloride to pass out of the furnace with the hydrochloric acid fumes. Hence, in this instance, a sufficient quantity of alkali carbonate should be added to the initial mixture to leave in the sintered product sufficient alkali metal oxide to permit the leaching out of the alkali aluminate.

I have found calcium chloride may be mixed with clay and carbon and subjected to temperatures ranging from 1500° to 2000° F. vapor of water being blown over and through this heated mixture, under conditions where a large surface area of the clay is exposed to the action of the vapor of water and alkali earth salt, and that the acid radical of said salt will pass off with the fuel gases as HCl and may be condensed and utilized in the production of salts of other bases, or as pure acids, and the product secured as a solid from this step may contain one or more molecules of calcium to one molecule of alumina and two or more molecules of the silica form the clay employed. And knowing the composition of this product, it may be mixed with either or both sodium carbonate and calcium carbonate (or potassium carbonate may be used in lieu of sodium carbonate), so that the ground mixture formed shall contain one molecule of alkali metal oxide or up to substantially less than one and seventy-six hundredths to one molecude of alumina, and two molecules of calcium oxide, or its equivalent to one molecule of silica. The latter ratio should be as exact as the mixture can be proportioned. This mixture may now be preferably passed through a furnace of the rotary type and sintered, preferably at a temperature just below its melting point, in which case there is procured a product from which the alkali aluminate is in proper form for leaching, and which will give an alkali aluminate best suited for the economical separation of oxide of aluminum of maximum pureness.

I am aware of the Kayser patent mentioned hereinbefore, and disclaim the invention therein disclosed. I am also aware that excessive amounts of sodium carbonate in the presence of lime have been commonly used to form fusions to render silicates soluble in the chemical practice of ordinary analyses. I am aware that calcium chloride in small quantities has been used to nodulize ground feldspar. But, in such work the amount of calcium chloride employed was not sufficient to furnish two molecules of calcium to one molecule of silica in the finished product, and when operated in a rotary furnace, potassium chloride volatilizes away, removing it from the alkali metal oxide aluminum silicate. I am also aware of the process of sintering ferruginous bauxite with excessive amounts of soda carbonate to form sodic aluminate, but here lime was not employed and therefore silicious types of bauxites could not be utilized as in my process. I disclaim each and all of these as being within the range of my invention.

I have leached over eighty-five per cent of the alumina from the sinters above described, and higher percentages can be secured.

Having thus fully set forth my invention and the manner in which it is to be carried out, what I claim is:

1. The process of obtaining alumina from its silicates which consists in forming a sintered product containing two molecular weights of lime to one of silica and less than one molecular weight of alkali metal oxide to one of alumina, leaching the product thus obtained and separating the alumina contained in the leached liquor.

2. The process of obtaining alumina from mixtures containing lime, silica, alumina and alkali metal oxide, which consists in forming a sintered mixture containing two molecular weights of lime to one of silica and less than one molecular weight of alkali metal oxide to one of alumina, leaching in a lye containing caustic alkali and recovering the alumina.

3. The process of obtaining alumina from its silicious compounds, which consists in forming a sintered product containing substantially two molecular weights of lime to one of silica, and less than one molecular weight of alkali metal oxide to one of alumina, dissolving from the product alumina, employing a lye containing a surplus of alkali metal oxide molecules compared to alumina molecules in the same and separating alumina from the solution so obtained.

4. The process of securing alumina from its alkali silicate compounds which comprises forming an alkali metal silico aluminate from a mixture of clay and salt, adding thereto lime in such proportion that the mixture when sintered shall contain two molecular proportions of lime to one of silica and less than one molecular proportion of an alkali metal oxide to one of alumina, sintering the mixture and dissolving out the contained alkali metal aluminate with a lye containing alkali metal oxide and alumina.

5. A furnace charge mixture so compounded that after grinding and sintering it shall contain substantially two molecules of lime to one of silica and less than one molecule of sodium metal oxide to one of alumina together with such impurities as iron oxide as do not effect the leaching and recovering of nearly all of the alkali metal aluminates.

6. A furnace charge mixture so compounded that after grinding and furnacing it shall contain two molecules of lime to one of silica and less than one molecule of alkali metal oxide to one of alumina together with such impurities as iron oxide as do not effect dissolving and recovering nearly all of its alkali metal aluminates when the dissolving liquor is a lye containing from one to seven molecules of alkali metal oxide to one molecule of alumina, substantially as set forth.

7. The process of separating alumina from silica which consists in heating a mixture containing alumina, silica, alkali metal oxide and lime, in the proportion of two molecules of lime to one of silica, and less than one molecule of alkali metal oxide to one of alumina, leaching out the alkali metal aluminate thus formed and recovering the alumina from the solution, substantially as described.

8. The process of separating alumina from silica which consists in heating a mixture containing as compounds or radicals alumina, silica, alkali metal oxide and lime in the proportion of two molecules of lime to one of silica and less than one molecule of alkali metal oxide to one of alumina, dissolving out the alkali metal aluminate thus formed, employing a lye containing several molecules of alkali metal oxide to one molecule of alumina, substantially as set forth.

9. In the production of alumina from alumina united with silica, the herein described process; forming a mixture of sodium carbonate, lime and said alumina silica compound so proportioned that upon heating to a suitable temperature insoluble calcium silicate is formed, and a soluble combination of sodium metal oxide with alumina in such proportion that the sodium metal oxide in said product exists as less than one molecule of the same to one molecule of alumina, heating to said temperature, dissolving from said product sodium metal oxide and alumina, employing as a solvent a lye containing several molecules of alkali metal oxide to one molecule of alumina, and separating alumina from the alkali metal aluminate solution formed by well known means.

10. In the production of alumina from alumina combined with silica and an alkali metal oxide, the herein described process; forming a mixture of a carbonate of an alkali metal, lime and said alumina silica alkali metal oxide compound so proportioned, that upon heating to a suitable temperature insoluble calcium silicate is formed and a soluble combination of alkali metal oxide with alumina in such proportion that the alkali metal oxide in said product exists as less than one molecule of the same to one molecule of alumina, heating to said temperature, dissolving from said product alkali metal oxide and alumina, employing as a solvent a lye containing several molecules of alkali metal oxide to one molecule of alumina and separating alumina from the alkali metal aluminate solution formed by well known means.

11. In the process of separating alumina from silica from a furnace product containing them, together with an alkali metal oxide radical and lime, wherein the molecular ratio of alkali metal oxide to alumina is less than one to one and of lime to silica is two to one, a step involving the selection of materials before furnacing of low silica content to prevent loss of alkali metal aluminate by rendering less bulky the insoluble product left after alkali metal aluminate has been dissolved from said product by aid of an alkali solvent and prior to the separation of alumina from the solution so obtained.

12. In the process of separating alumina from silica from a furnace product containing them together with an alkali metal oxide radical and lime, wherein the alkali metal oxide to the alumina molecular ratio is less than one to one, a step involving lowering the molecular ratio of lime to silica below two to one before furnacing and thereby making allowance for basic impurities which substitute themselves for lime in their combination with silica in forming the equivalent of insoluble di-calcium silicate prior to dissolving alkali metal aluminate from said product and separating the alumina by well known means.

Signed at New York, in the county of New York and State of New York, this 11th day of May, A. D. 1920.

ALFRED H. COWLES.